United States Patent [19]

Bernardoni

[11] 4,422,416

[45] Dec. 27, 1983

[54] INTAKE DUCT FITTED WITH NON-RETURN VALVE MEANS

[75] Inventor: Luigi Bernardoni, Tradate, Italy

[73] Assignee: Alfa Romeo S.p.A., Milan, Italy

[21] Appl. No.: 307,098

[22] Filed: Sep. 30, 1981

[30] Foreign Application Priority Data

Oct. 17, 1980 [IT] Italy .............................. 25427 A/80

[51] Int. Cl.³ ............................................ F02B 77/00
[52] U.S. Cl. ............................. 123/52. MF; 123/65 P
[58] Field of Search ............. 123/52 M, 52. MF, 65 P, 123/70 R

[56] References Cited

U.S. PATENT DOCUMENTS

| | | | |
|---|---|---|---|
| 1,978,816 | 10/1934 | Pollister | 123/65 P |
| 2,337,982 | 12/1943 | Ericson | 123/52 MF |
| 3,935,842 | 2/1976 | Ishizawa et al. | 123/52 MF |
| 4,084,554 | 4/1978 | Bohnlein | 123/52 MF |
| 4,312,305 | 1/1982 | Noguchi et al. | 123/70 R |

Primary Examiner—Craig R. Feinberg
Attorney, Agent, or Firm—Charles E. Brown

[57] ABSTRACT

The invention relates to an intake duct for feeding mixture or air to a four-stroke internal combustion engine cylinder provided with the usual intake valve or valves, non-return valve means being provided in said duct in series with said intake valve or valves, said non-return valve means being arranged to allow the flow of mixture or air to said cylinder, and being arranged to prevent the reverse flow of mixture returned by the cylinder, from the intake duct to the outside.

2 Claims, 2 Drawing Figures

U.S. Patent     Dec. 27, 1983     4,422,416
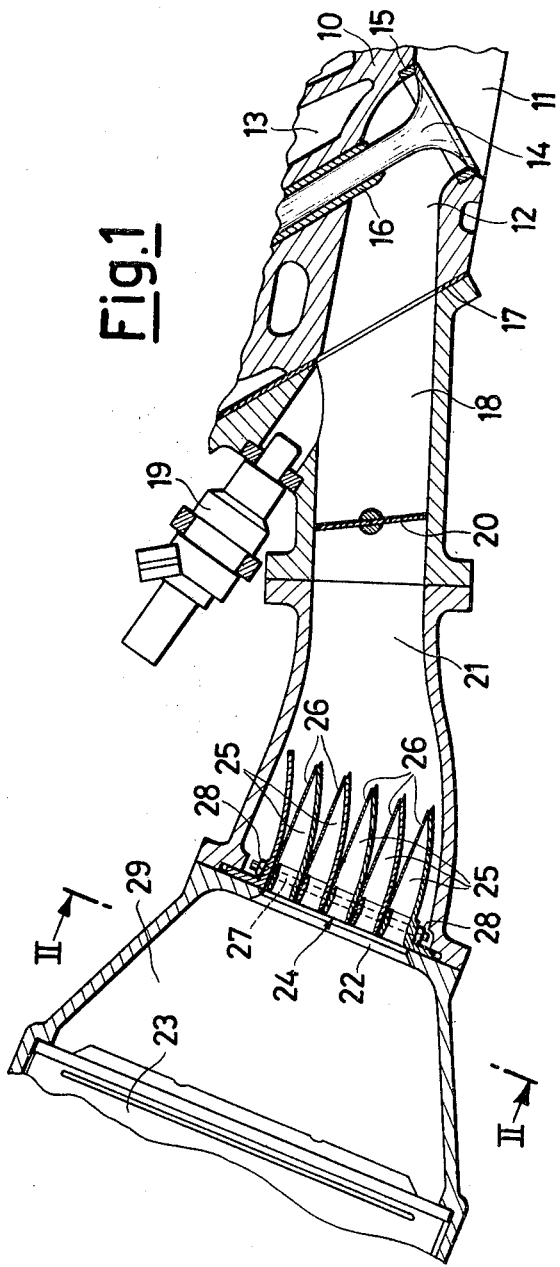

INTAKE DUCT FITTED WITH NON-RETURN VALVE MEANS

This invention relates to an intake duct for feeding air or mixture to a four-stroke internal combustion engine cylinder, said duct being fitted with non-return valve means arranged to prevent the backward flow of fresh mixture which can be returned by the cylinder into the duct, at the end of the suction stroke and during crossover.

The parameters which influence the volumetric efficiency of a four-stroke internal combustion engine at full admission, such as the design of the intake and exhaust ducts, the sizing of the passage cross-sections through the intake and exhaust valves, and the timing, are generally optimised for a determined rotational speed, which is higher the greater the specific engine power, and these therefore produce greater or lesser penalties during low speed operation.

In particular, with regard to timing, if this is fixed as in most engines, the use of a large delay angle in closing the intake valves serves to increase the cylinder filling at high speeds, both because of inertia effects due to the flow of mixture which by virtue of the high speed continues to enter the cylinders even at the beginning of the compression stroke, and because of resonance effects under the conditions in which the pressure fluctuations in the fluid stream are in phase with the movement of the intake valves.

Below certain rotational speeds, the inertia of the fluid column entering the cylinders reduces because of the reduced speed, and at the beginning of the compression stroke part of the mixture is returned to the intake side through the intake valves which are still open, so that the volumetric efficiency falls.

Likewise, a large crossover angle (simultaneous opening of the intake and exhaust valves) favours the emptying of the burnt gas from the cylinders only at determined rotational speeds, whereas at rotational speeds very close to these there is a return of burnt gas from the exhaust to the cylinders, and also to the intake side itself, leading to a further penalty on the cylinder filling.

In order to reduce filling losses at low rotational speeds, variable timing could be used, but in order to attain a reduction both in the opening advance and in the closing delay of the intake valves it would be necessary to use rather complicated and thus costly devices, which in certain cases would be of low reliability.

A system has therefore been devised which instead of requiring adjustments to the engine timing uses another method for obviating the volumetric efficiency losses which normally occur at low rotational speeds of four-stroke internal combustion engines due to the fixed timing.

According to the present invention, the intake duct which supplies an engine cylinder is fitted with non-return valve means disposed in series with the normal intake valve (or valves), said non-return valve means being arranged to allow mixture or air to flow to said cylinder, and being arranged to prevent the backward flow of mixture returned by the cylinder, from the intake duct to the outside.

By this means, the fresh mixture which at low engine rotational speeds flows back from the cylinder into the intake duct at the end of the intake stroke, due to the delay in closure of the intake valve, is retained in said duct by said valve means, which are closed due to the lack of a pressure difference able to cause them to open. A pocket of mixture with a certain overpressure is thus created in the duct between said non-return valve means and the intake valve, and is thus able to return to the cylinder at the commencement of the next intake stroke, thus favouring expulsion of the burnt gas and improving scavenging.

This leads to an overall increase in cylinder filling at low engine rotational speeds.

According to a preferred embodiment, said non-return valve means are formed with a plurality of elastically flexible blades partly disposed side-by-side and partly superposed, which are connected to a support frame formed from a plurality of channels partly disposed side-by-side and partly superposed and disposed in the flow direction of the mixture or air feeding the engine, said blades being fixed to said frame so that they are also disposed in said flow direction in such a manner as to close the relative channels when at rest.

Characteristics and advantages of the invention will be more apparent from FIGS. 1 and 2, which show a preferred embodiment of the invention by way of non-limiting example.

FIG. 1 is a longitudinal section through an intake duct of a four-stroke engine of the indirect petrol injection type, and fitted with non-return valve means, in accordance with the present invention;

FIG. 2 is a partial section on the line II—II of FIG. 1.

In FIG. 1, the reference numeral 10 indicates a four-stroke i.e. engine head comprising the partly visible explosion chamber 11, the end portion 12 of the intake duct, and the cavity 13 for passage of the cooling liquid. The figure also shows the intake valve 14, its seat 15 and the valve stem guide 16. The relative cylinder is not shown.

The intermediate portion 18 of the intake duct, in which the petrol injector 19 and the throttle valve 20 are disposed, is flanged to the head 10 by way of the gasket 17.

The duct portion 21 is connected to the duct 18, and acts as a connection piece between the circular cross-section of said duct 18 and the rectangular cross-section of the outlet port 22 of the air intake 29, in which the filter 23 is inserted.

At the mouth of the connector 21 there is disposed a block forming the non-return valve means, indicated overall by 24 and constituted by superposed modules each comprising three arcuate-based channels 25 (also visible in FIG. 2), and by three corresponding flexible blades 26 which, when at rest, lie against the edges of said channels, so closing them.

The blades 26 are retained with one end between the modules comprising the channels 25, and are locked by the pins 27 with threaded ends and the nuts 28. The direction of the channels 25 and blades 26 is parallel to the flow of air entering from the port 22.

When the engine operates at full admission (throttle 20 open), a small pressure difference is created across the valve means 24 during the intake stroke of the cylinder fed by the duct 12-18-21, and this causes the blades 26 to rise, so allowing feed air to enter, and after mixing with the petrol delivered by the injector 19, this penetrates into the cylinder through the passage cross-section uncovered by the opening of the valve 14.

At the end of the cylinder intake stroke, the pressure difference across the valve means 24 is reduced, and the blades 26 are lowered, so closing the channels 25.

If under these conditions a backflow of mixture takes place from the cylinder into the intake duct 12-18-21, the valve means 24 prevent it from flowing into the filter 23. At the same time, the overpressure which arises in said intake duct prevents the backflow of fresh mixture from the cylinder, so that the quantity which returns to the intake side is small.

The mixture which is returned into the intake duct is again drawn in by the cylinder at the beginning of the next intake stroke, and because of its overpressure it helps the expulsion of burnt gas from said cylinder, giving a good scavenging effect even at low engine rotational speeds.

The block 24 comprising the valve means can also be arranged in another position in the intake duct 12-18-21, for example downstream of the throttle valve 20.

If the engine is multi-cylinder, a block comprising the valve means such as that indicated by 24 in FIG. 1 is provided in each intake duct of each cylinder or in a duct common to cylinders spaced-apart in the order of explosion.

In constructing the block 24 comprising the valve means, small blades 26 have been used in order to increase their inherent frequency and minimise their lifting stroke and the pressure difference necessary for lifting them, in order to increase their permeability and response speed. Account must however be taken of the fact that neither the width nor the maximum opening of the blades 26 can be reduced beyond certain limits in order not to excessively reduce the mouth cross-sections of the channels 25, and produce a frame grid which is too dense, so worsening the ratio of the restricted to the unrestricted part of the cross-section of the port 22, because this would lead to an excessive pressure drop in the engine mixture or feed air stream.

I claim:

1. An intake duct for feeding a mixture which comprises one of air and air-fuel from outside said intake duct to at least one cylinder of a four-stroke internal combustion engine, provided with at least one intake valve, characterised by being fitted with non-return valve means disposed in series with said at least one intake valve, said non-return valve means being arranged to allow mixture to flow in a direction to said at least one cylinder, being arranged to prevent backward flow of the mixture returned by said at least one cylinder, from said intake duct to the outside, said non return valve means being formed from a plurality of elastically flexible blades partly disposed side-by-side and partly superposed, and being connected to a support frame formed from a plurality of substantially parallel channels extending towards said at least one cylinder and being partly disposed side-by-side and partly superposed and disposed in the flow direction of the mixture feeding the engine, said blades being fixed to said frame so that they are also disposed in said flow direction in such a manner so as to close the relative channels when at rest.

2. An intake duct as claimed in claim 1, characterised in that said non-return valve means are formed from superposed modules comprising sets of arcuate-based channels disposed in the flow direction of the mixture feeding the engine, and from sets of corresponding flexible blades locked at one end between the channel modules in such a manner as to lie, when at rest, against the edges of said channels, so closing them.

* * * * *